United States Patent
Liu et al.

(10) Patent No.: US 9,384,290 B1
(45) Date of Patent: Jul. 5, 2016

(54) LOCAL MOBILE MEMO FOR NON-INTERRUPTING LINK NOTING

(71) Applicant: Google Inc., Mountain View, CA (US)

(72) Inventors: Yifang Liu, Mountain View, CA (US); Zhenyu Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 315 days.

(21) Appl. No.: 13/667,619

(22) Filed: Nov. 2, 2012

(51) Int. Cl.
*G06F 17/30* (2006.01)

(52) U.S. Cl.
CPC .................................. *G06F 17/3087* (2013.01)

(58) Field of Classification Search
None
See application file for complete search history.

(56) References Cited

U.S. PATENT DOCUMENTS

| | | | | |
|---|---|---|---|---|
| 5,801,702 A * | 9/1998 | Dolan | ............... | G06F 17/30855 707/E17.013 |
| 6,184,886 B1 * | 2/2001 | Bates | ............... | G06F 17/30884 707/E17.114 |
| 6,208,996 B1 | 3/2001 | Ben-Shachar et al. | | |
| 6,864,904 B1 * | 3/2005 | Ran | ................... | G06F 17/30905 707/E17.121 |
| 6,948,118 B2 * | 9/2005 | Genty | ............... | G06F 17/30884 707/E17.114 |
| 7,233,229 B2 | 6/2007 | Stroupe et al. | | |
| 7,386,792 B1 * | 6/2008 | Bascom | ............ | G06F 17/30882 707/E17.013 |
| 7,593,982 B2 * | 9/2009 | Busey | ............... | G06F 17/30067 707/999.003 |
| 7,599,915 B2 * | 10/2009 | Hill | ................... | G06F 17/30873 |
| 7,664,825 B2 * | 2/2010 | Yeung | ................... | H04L 29/06 709/203 |
| 8,201,075 B2 | 6/2012 | Adams | | |
| 8,433,995 B1 * | 4/2013 | Karam | ............. | G06F 17/30884 715/206 |
| 8,589,811 B2 * | 11/2013 | Gotz | .................. | G06F 17/3089 706/12 |
| 2004/0204128 A1 * | 10/2004 | Zakharia et al. | ............... | 455/566 |
| 2004/0254844 A1 * | 12/2004 | Torres | ............. | 705/26 |
| 2005/0021417 A1 * | 1/2005 | Kassan | ............. | 705/26 |
| 2006/0031781 A1 * | 2/2006 | Keohane et al. | ............. | 715/807 |
| 2006/0143559 A1 * | 6/2006 | Spielberg et al. | ............. | 715/512 |
| 2006/0271398 A1 * | 11/2006 | Belcastro | ............. | 705/2 |
| 2007/0266011 A1 * | 11/2007 | Rohrs et al. | ............. | 707/3 |
| 2007/0288583 A1 | 12/2007 | Rensin et al. | | |
| 2011/0202864 A1 * | 8/2011 | Hirsch et al. | ............. | 715/773 |
| 2011/0202877 A1 * | 8/2011 | Lassonde et al. | ............. | 715/817 |
| 2011/0213655 A1 * | 9/2011 | Henkin et al. | ............. | 705/14.49 |
| 2012/0011511 A1 | 1/2012 | Horvitz et al. | | |
| 2012/0084632 A1 * | 4/2012 | Lim et al. | ............. | 715/206 |
| 2013/0241847 A1 * | 9/2013 | Shaffer et al. | ............. | 345/173 |

* cited by examiner

*Primary Examiner* — Hien Duong
(74) *Attorney, Agent, or Firm* — McDonnell Boehnen Hulbert & Berghoff LLP

(57) ABSTRACT

Systems, methods, routines and/or techniques for a local mobile memo for non-interrupting link noting are described. One or more embodiments may include a method that may include displaying to a user a page containing a link, receiving a first user input that indicates the link should be saved for potential later processing and saving the link to a local repository so that the link can be processed later. The saving may occur while the page continues to be displayed. The saving may occur without processing the link to perform the associated action. The method may include displaying a list (e.g., including the link) of one or more links saved in the repository, for example, in response to an event that indicates that the user may be interested in viewing links in the link repository.

15 Claims, 9 Drawing Sheets

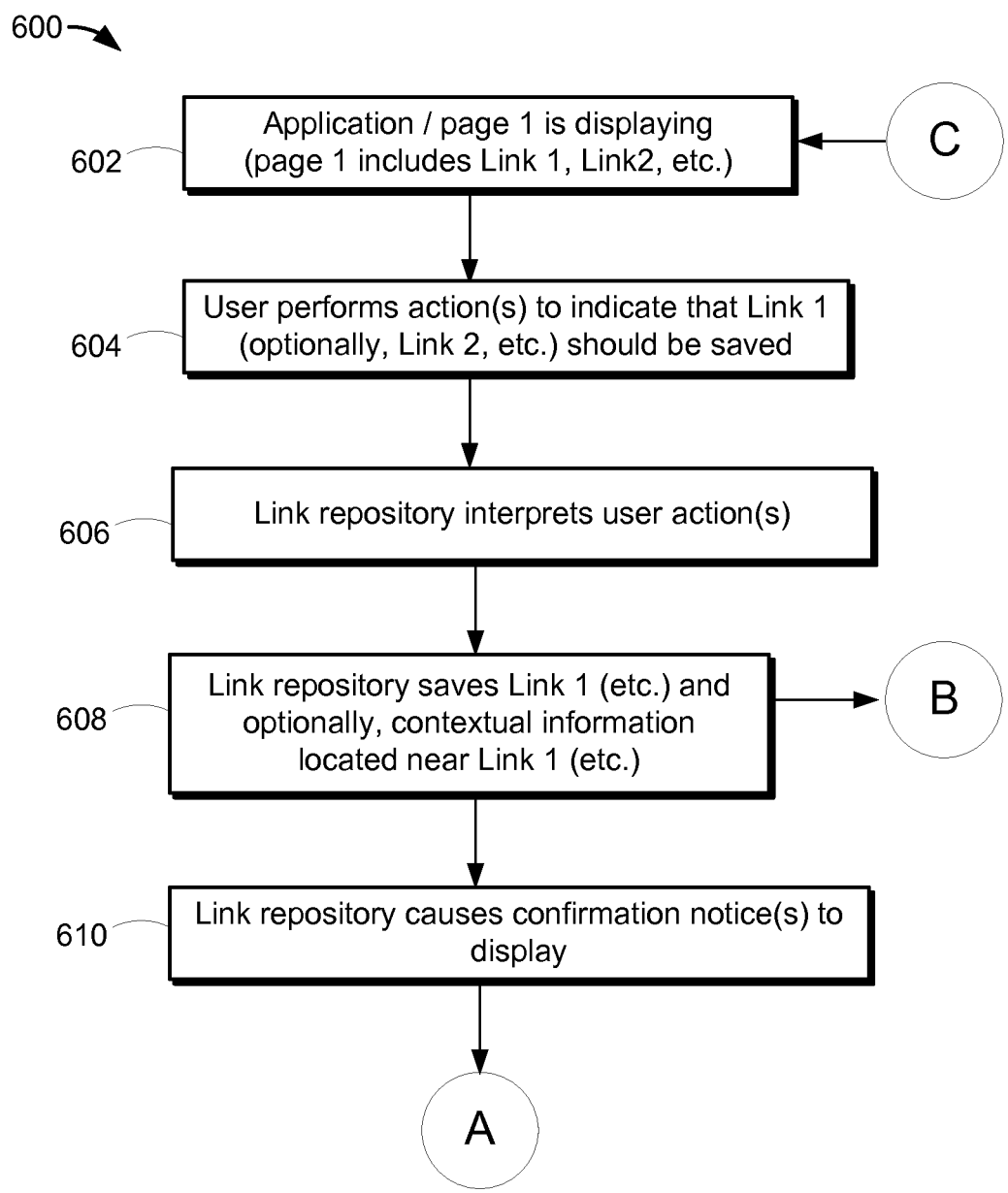

LOCAL MOBILE MEMO FOR
NON-INTERRUPTING LINK NOTING

FIELD

The present disclosure relates to saving links on mobile devices, and more particularly to one or more systems, methods, routines and/or techniques for a local mobile memo for non-interrupting link noting.

BACKGROUND

Mobile devices such as smartphones have become more advanced. Some mobile devices incorporate a processor that runs computer code, including code that implements an operating system (OS). Some mobile devices are capable of running applications, for example, web browsers that display standard web pages as well as mobile-optimized web pages. Some mobile devices include a screen, for example, a touchscreen, that may span a substantial portion of an outside surface of the mobile device. A touchscreen may allow a user to interact with the mobile device using a pointer or a finger.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for a local mobile memo for non-interrupting link noting. One or more systems, methods, routines and/or techniques may include an intelligent local memo with a link repository. One or more systems, methods, routines and/or techniques may allow a user to save a link, for example, a link that is embedded in a page and/or application that the user is currently viewing. One or more systems, methods, routines and/or techniques may allow a user to save the link in the link repository of the local memo without interrupting what the user is doing on a current page and/or application. The local memo may display an indication of saved links, for example, when the user exits the current page and/or application.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIGS. 6A-6C depict a flow diagram that shows example steps in a method for a local mobile memo for non-interrupting link noting, in accordance with one or more embodiments of the present disclosure.

DETAILED DESCRIPTION

Mobile device screens have become larger over the years, but the screens on various devices are still substantially smaller than many monitors for desktop computers. Because of the small screen size of various mobile devices, various applications that are designed for mobile devices may be programmed to use most or all of the screen. In some situations, it may not be feasible or desirable to split the screen between multiple applications at the same time. In the situations where a single application consumes the screen at any one time, a user may be inconvenienced. For example, the user may have to select one application at a time to focus on, and the user may avoid actions that may take the user away from the current application. For example, if a user is navigating a webpage (e.g., a news webpage) in a web browser, the user may see an embedded link (e.g., a URL or URI to a different news story) that interests the user, but the user may avoid taking an action that may activate the link because the user may know that taking such an action will cause a different window to consume the mobile device screen, perhaps interrupting what the user is doing on the current screen (e.g., reading the current news story). If the user chooses to avoid activating the embedded link, the user may forget to return to that link once the user is finished with the current application and/or screen. Effective, productive and/or efficient use of one or more applications, and/or effective, productive and/or efficient use of the screen "real estate" of mobile devices may be important.

The present disclosure describes one or more systems, methods, routines and/or techniques for a local mobile memo for non-interrupting link noting. One or more systems, methods, routines and/or techniques may include an intelligent local memo with a link repository. One or more systems, methods, routines and/or techniques may allow a user to save a link, for example, a link that is embedded in a page and/or application that the user is currently viewing. One or more systems, methods, routines and/or techniques may allow a user to save the link in the link repository of the local memo without interrupting what the user is doing on a current page and/or application. The local memo may display an indication of saved links, for example, when the user exits the current page and/or application.

Figure 1:
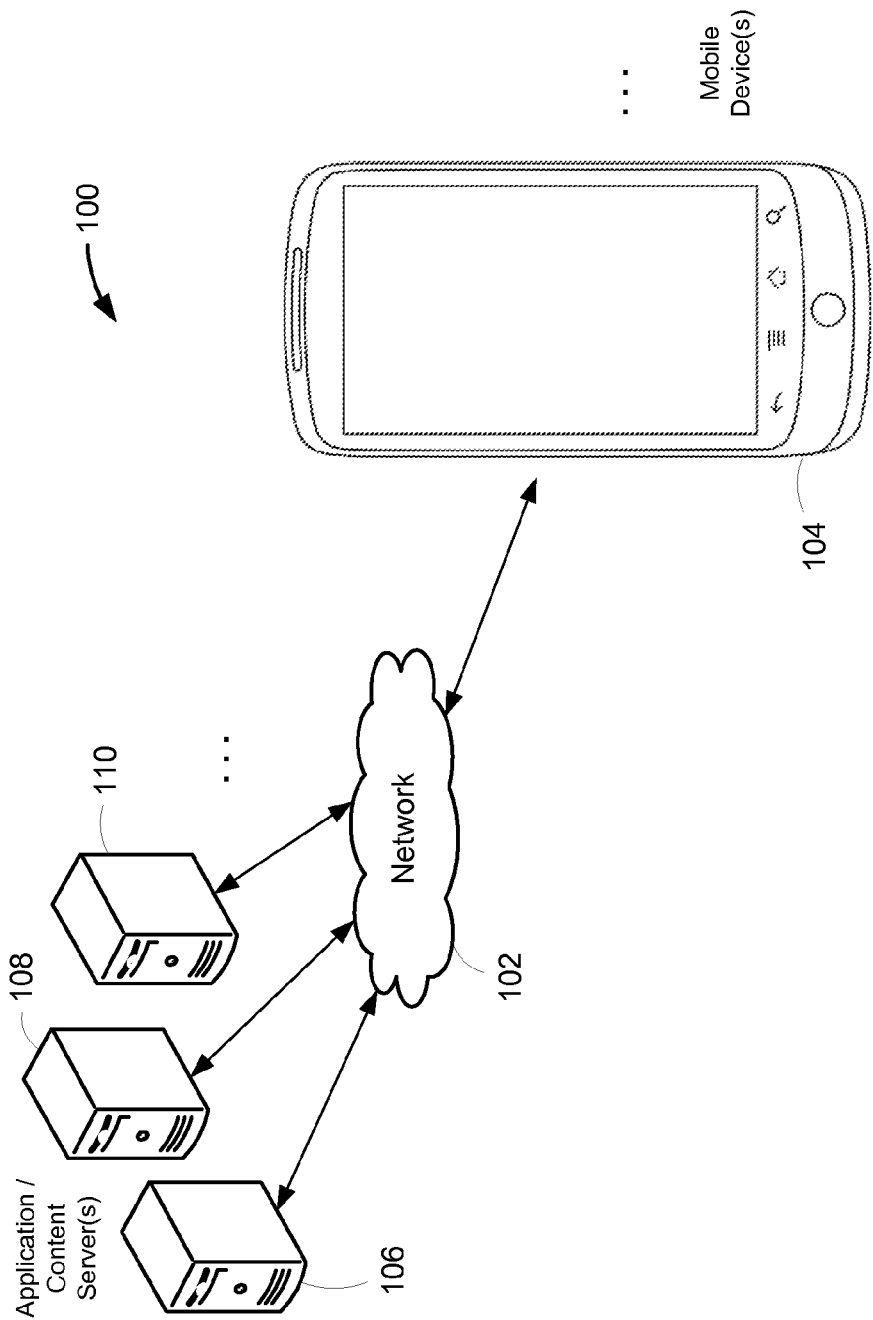
FIG. 1 depicts a block diagram showing example components, connections and interactions of a network setup, where one or more embodiments of the present disclosure may be useful in such a network setup.

FIG. 1 depicts a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more networks (for example, network 102), one or more mobile devices (for example, mobile device 104) and a number of servers (for example, application and/or content servers 106, 108, 110). Network 102 may be a medium used to provide communication links between various devices, such as data processing systems, servers, mobile devices and perhaps other devices. Network 102 may include connections such as wireless or wired communication links. In some examples, network 102 represents a worldwide collection of networks and gateways that use the Transmission Control Protocol Internet Protocol (TCP IP) suite of protocols to communicate with one another. In some examples, network 102 may include or be part of an intranet, a local area network (LAN), a wide area network (WAN) and/or the Internet. Network setup 100 may include one or more mobile devices, for example, mobile device 104. Mobile devices may communicate with application servers and/or content servers, and optionally other servers and/or devices, via one or more networks.

Figure 2:
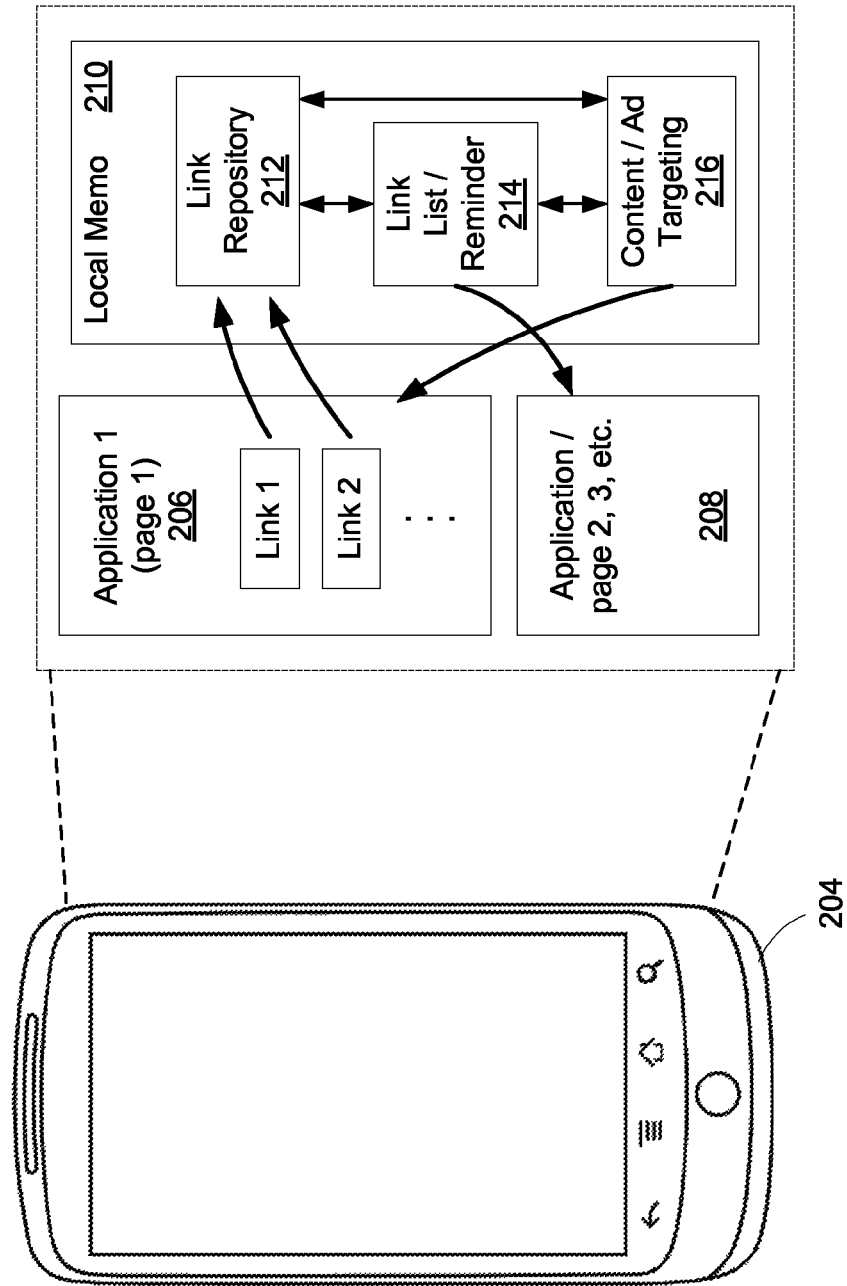
FIG. 2 depicts an illustration of an example mobile device or smartphone and various example pieces of code or functions that may run or execute on a mobile device or smartphone, according to one or more embodiments of the present disclosure.

FIG. 2 depicts an illustration of an example mobile device 204 or smartphone, according to one or more embodiments of the present disclosure. Mobile device 204 may be substantially similar to the mobile device 104 of FIG. 1, for example. Mobile device 204 may incorporate a processor that runs or executes computer code, including code that implements an operating system (OS), other native code (i.e., code written by the creator of the smartphone and/or the operating system) and code developed by third parties (e.g., third party applications). Mobile device 204 may also run or execute code from one or more software development kits (SDKs) and/or one or more application programming interfaces (APIs). FIG. 2 depicts various example pieces of code or functions that may run or execute on mobile device 204.

Mobile device 204 may include code related to one or more applications, for example, application 1 (indicated generally by part 206). Each application may be programmed to display one or more pages or frames on the screen of the mobile device 204. For example, application 1 may display a page 1 (also indicated generally by part 206). Referring to FIG. 2, part 208 may generally indicate other applications and/or pages or frames that may be displayed on the mobile device 204. As one specific example, application 1 may be a web browser that displays a page 1 (part 206), which may be a first web page, and part 208 may indicate a page 2 that the web browser displays, e.g., a second web page. As another specific example, application 1 may be a web browser that displays a page 1 (part 206), and part 208 may indicate a different application, i.e., application 2, for example, a phone application. In some embodiments, a page displayed by an application may take up, fill or consume the entire screen of the mobile device 204. For example, page 1 of application 1 may consume the entire screen of the mobile device 204. In this example, according to various techniques, a user may have to switch to a different application or a different page in order to see something other than what is displayed on page 1 of application 1 (part 206). One or more systems, methods, routines and/or techniques of the present disclosure may provide one or more solutions to address this inconvenience.

Mobile device 204 may include code related to a local memo 210. Local memo 210 may accept input from a user and may communicate with one or more applications, for example, application(s) 1, 2, 3, etc. (denoted generally by parts 206, 208). Local memo 210 may save one or more links, for example, links that are embedded in a page and/or application that the user is currently viewing. Local memo 210 may allow a user to save the one or more links without interrupting what the user is doing on a current page and/or application. Local memo 210 may remind the user of (or otherwise indicate) saved links, for example, when the user exits the current page and/or application. Local memo 210 may be implemented at various levels and/or layers of the mobile phone architecture. For example, local memo 210 may be implemented at the operating system (OS) layer, for example, as a continuously running background process. The background process may listen for input from a user, for example, a finger swipe via a touchscreen, and may communicate with one or more applications. As another example, local memo 210 may be implemented as an application (e.g., at the native application layer), for example, as a continuously running background application. The background application may communicate with the OS to accept input from a user, and may communicate with one or more other applications.

Local memo 210 may include one or more settings and/or configuration pages and/or frames. A settings and/or configuration page may allow a user and/or administrator to configure the local memo to operate in a particular manner. A user may access and/or navigate to a settings and/or configuration page/frame in a variety of ways. For example, the user may access a settings and/or configurations page in a manner similar to the way a user would access various settings related to the OS running on the mobile device. As another example, the user may access a settings and/or configuration page in a manner similar to the way a user would access various applications installed on the mobile device.

Local memo 210 may include a number of pieces of code, functions, modules, routines, or the like, for example, link repository 212, link list/reminder 214 and content/ad targeting 216. Link repository 212 may save, store or note links (and optionally, additional information), for example, in response to input from a user. Link repository 212 may allow a user to save one or more links into the link repository 212 without interrupting what the user is doing on a current page and/or application. It should be understood that term "link" may refer generally to any piece of information from a page or frame displayed by an application, where the information may be used or processed to by an application or software program to perform a function or action. For example, a link may refer to a Uniform Resource Locator (URL) or Uniform Resource Identifier (URI) or URI from a webpage, where the URL or URI may be saved in the link repository and may be used by a web browsing application to navigate to the URL or URI. As another example, a link may refer to a telephone number (e.g., an active URL or URI or simple text), where the telephone number may be saved in the link repository and may be used by a telephone application later to call the telephone number. As another example, a link may refer to a street address (e.g., an active URL or URI or simple text), where the street address may be saved in the link repository and may be used by a maps application later to display an interactive map related to the street address. Various other examples of links will become apparent after referencing this disclosure.

In general, a user of a mobile device (e.g., mobile device 204), while viewing a page generated by an application (e.g., page 1 of application 1, indicated generally at part 206) may perform some action (e.g., a finger swipe) with respect to the mobile device to cause the local memo 210 and/or the link repository 212 to save one or more links (e.g., link 1, link 2, etc. as shown in FIG. 2). The local memo 210 and/or the link repository 212 may save these one or more links without interrupting the user, e.g., without causing the screen of the mobile device to display a different page and/or application. The local memo 210 and/or the link repository 212 may communicate with one or more storage and/or memory means in the mobile device 204 to save and/or recall information. For example, local memo 210 and/or the link repository 212 may communicate with volatile or non-volatile memory, persistent storage, flash memory or the like.

Link repository 212 may save, store or note additional information along with a link, for example, contextual information. For example, when a user indicates that the link repository 212 should save a link, the link repository 212 may also analyze and/or capture text (i.e., snippets) that surrounds the link as it appears in the current page and/or application. The link repository 212 may capture a few sentences and/or lines of text that appear around the link, for example, before, after, above, below, left of and/or right of the link. These snippets of text that surround the link may indicate information about the link, for example, the general content that the link points to or is associated with. As another example of contextual information, the link repository 212 may capture general information about the current page that the user is viewing, for example, information appearing elsewhere in the page and/or information provided in keywords and/or comments of the code used to generate the page. The link repository 212 may capture general information from the frame or step of an application as displayed, if applicable. Contextual information may be analyzed by one or more other pieces of code, functions, modules, routines, or the like in the local memo 210 to determine information about the links that the user saved. For example, a content/ad targeting function may aid in formulating content requests that are related to keywords, topics and the like that appear in the contextual information saved in the link repository 212.

As another example of additional information saved along with a link, when a user indicates that the link repository 212 should save a link, the link repository 212 may also save a reverse link, which may be a link that refers back to the current webpage that the user is viewing. The reverse link may include a page URL or URI and/or a shortcut to an application (optionally, with an indication of a particular page, frame or step). The reverse link may allow a user, when viewing saved links, to determine the source of the link, i.e., which application and/or page the user was viewing when the user saved the link.

Figure 3:
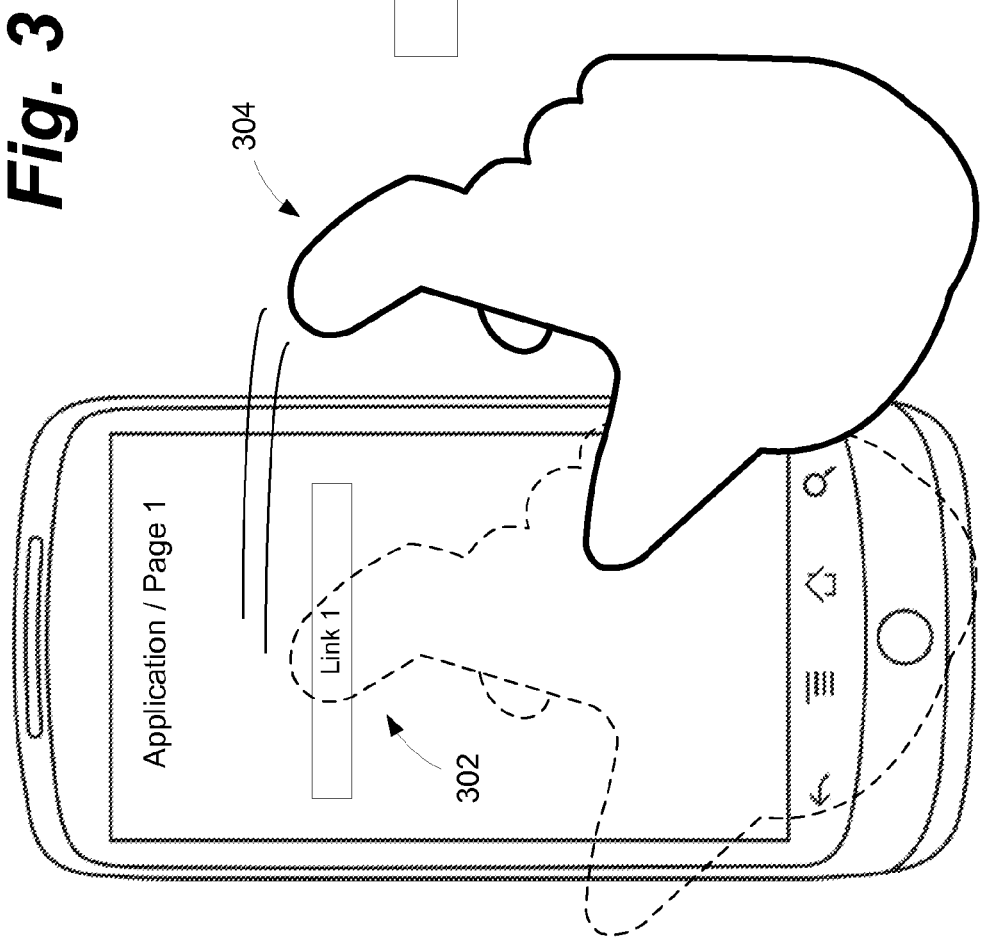
FIG. 3 depicts an illustration of an example user action with respect to a mobile device or smartphone and an example confirmation notice, according to one or more embodiment of the present disclosure.

Link repository 212 may save, store or note links in response to user input, for example, one or more user actions with respect to the mobile device 204. Local memo and/or link repository 212 may utilize one or more user interface (UI) schemes to accept and/or interpret user input. If the local memo 210 is implemented at the operating system (OS) layer, the local memo may communicate with one or more device drivers, for example, a driver that facilitates communication between the OS and the touchscreen. If the local memo 210 is implemented as an application, the local memo may communicate with the OS to accept input from a user. Local memo 210 and/or link repository 212 may accept and interpret various user actions that may indicate, among other things, that a link should be saved. For example, a user may swipe or gesture pointer(s) (e.g., digital or physical) or finger(s) across or within the screen of the mobile device, for example, where a swipe or gesture moves over or near a link that the user wants to save. An example of a swipe may be a right, left, up, down or diagonal swipe, for example, that starts on or near the link and moves to the edge of the screen. FIG. 3 shows one example of a swipe that may be used to store a link, according to one or more embodiment of the present disclosure. As can be seen in FIG. 3, a user may be viewing an application and/or page on a mobile device, where the application and/or page includes a link (e.g., Link 1). The user's finger may touch the screen of the mobile device at a first location 302, near Link 1. The user's finger may then swipe across the screen ending at a second location, e.g., location 304. The second location may be near the edge of the screen or off the edge of the screen.

It should be understood that FIG. 3 shows just one example of a user actions, and this disclosure contemplates several other user actions that may indicate, among other things, that a link should be saved. Another example of a swipe may include swiping multiple pointers or fingers concurrently, for example, a two-finger pinch on or near a link. An example of a gesture may be a curve or sequence of swipes that moves around the screen surface, such as an "S" for "save." As another example of a user action, a user may click on or touch a link to indicate to the local memo 210 that the link should be saved. For example, the user may click on or touch a link within a special area. As another example, when a user clicks on or touches a link, the user may be presented with options, for example, "navigate to link," "activate link," "save link" and/or the like. As another example of a user action, a user may click on or touch a link and then continue to touch the link to activate a "dragging" mode. The dragging mode may allow a user to drag a representation of the link into an area of the screen that may indicate that the link should be saved. As a specific example, the user may touch and hold a link to activate dragging, and a toolbar or "bucket" may appear, and the user may drag the link into the toolbar or bucket to save the link. The user may then discontinue touching the screen, and the toolbar or bucket may disappear. As another example of a user action, a user may perform a gesture that does not include touching the mobile device, and the mobile device may detected and interpreted the gesture. As a specific example, a user may perform a gesture in the air with the user's hand and the mobile device may detect the gesture with an integrated camera. As another specific example, a user may speak or otherwise cause a sound and the mobile device may detect the sound with an integrated microphone. Various other user actions, for example, that may indicate that a link should be saved, will become apparent after referencing this disclosure.

Local memo 210 may include one or more settings and/or configuration pages and/or frames. A settings and/or configuration page may allow a user and/or administrator to configure the local memo to recognize, interpret and/or respond to one or more particular user actions, for example, user actions that indicate that a link should be saved. In this respect, a user may choose which actions cause a link to be saved.

Link repository 212 may indicate or display one or more confirmation notices when a link is saved, stored or noted. Local memo and/or link repository 212 may communicate with one or more user interface (UI) devices, drivers and the like in the mobile device in order to indicate a confirmation notice. For example, local memo and/or link repository 212 may communicate with the screen and/or speakers included in the mobile device. As one example of a confirmation notice, the local memo and/or link repository 212 may cause the screen of the mobile device to display a confirmation message, for example, as part of a box, bubble, logo or the like. FIG. 3 shows one example of a confirmation notice 312, according to one or more embodiments of the present disclosure. The confirmation notice 312 may have been displayed in response to a link being saved (e.g., Link 1 of FIG. 3). In some embodiments, the confirmation notice (i.e., the confirmation message and/or a box, bubble, logo or the like) may display on the screen of the mobile device for a period of time and then disappear. In some embodiments, the confirmation notice may fade away, for example, by becoming more transparent as time passes, until the confirmation message has disappeared.

It should be understood that FIG. 3 shows just one example of a confirmation notice, and this disclosure contemplates several other types of confirmation notices that may indicate, among other things, that a link is being or was saved. In some embodiments, a confirmation notice may linger or remain near a link that was saved, such that it appears to a user that the confirmation notice is displayed near the link in the page that the user is viewing. For example, an icon, logo, box, bubble, letter(s) or the like may linger or remain near the link that was saved, for example, to remind the user that the user saved the link. In this example, the local memo and/or link repository 212 may communicate with the application that displays the page that the user is viewing. In this example, the application that displays the page that the user is viewing may communicate with the local memo and/or link repository 212, for example, such that the application can receive information from the local memo and/or link repository 212 that a link was saved, and such that the application can displayed a confirmation notice near the link that was saved. In this regard, an application may use and/or implement an API (application programming interface) into the application to facilitate communication with the local memo and/or link repository 212.

Referring to FIG. 2, local memo 210 may include a link list/reminder 214. Link list/reminder 214 may display and/or remind a user of links that were stored in the link repository 212. In some embodiments, the link list/reminder 214 may be event-driven, for example, being adapted to remind and/or prompt a user of stored links in response to some event and/or routine that occurs in the mobile device. Various events and/or routines may cause and/or trigger the link list/reminder 214 to display an indication regarding saved links. For example, when a user indicates that the application and/or page that the user is viewing should be closed and/or exited, the link list/reminder 214 may display an indication to the user regarding saved links. In some embodiments, various time periods and/or time events may cause and/or trigger the link list/reminder 214 to display an indication regarding saved links. For example, the link list/reminder 214 may detect that a period of time (e.g., a configurable period of time) has passed, and may display an indication regarding saved links. As another example, the link list/reminder 214 may detect that a period of time (e.g., a configurable period of time) has passed since one or more forms of user input have been detected, and may display an indication regarding saved links. In this case, a period of time without user input may indicate that the user is ready to view previously saved links. In some embodiments, a comparison routine may cause and/or trigger the link list/reminder 214 to display an indication regarding saved links. For example, a comparison routine may compare a page that a user is viewing to information stored in the link repository regarding saved links, and the link list/reminder 214 may display an indication regarding saved links, for example if the content on the page the user is viewing is similar to information in the link repository. One example of an indication may include a message that displays on the screen of the mobile device that reads similar to the following: "It looks like you saved a link similar to what you are reading. Would you like to view it?" The comparison routine may perform this comparison on the same page or a different page than the page the user was on when the user saved the link. Other types of comparison routines are contemplated by this disclosure.

In some embodiments of the present disclosure, the link list/reminder 214 may be user-query driven, for example, being adapted to display an indication of stored links to a user in response to user input or a user query. Various types of user input may cause and/or trigger the link list/reminder 214 to display an indication regarding saved links. For example, the user may swipe or gesture pointer(s) (e.g., digital or physical) or finger(s) across or within the screen of the mobile device. Various other forms of user input may cause and/or trigger the link list/reminder 214 to display an indication regarding saved links, for example, types of user input similar to those discussed above with regard to saving links in the link repository 212. In some embodiments, the types of user input may be indicated in a settings and/or configuration page of the local memo 210. In some embodiments, the user may access an indication of saved links via a link repository management tool. The link management tool may be part of the local memo 210, and the user may navigate to and/or open the link repository management tool in various ways. For example, the user may access the link repository management tool in a manner similar to the way a user would access various settings related to the OS running on the mobile device. As another example, the user may access the link repository management tool in a manner similar to the way a user would access various applications installed on the mobile device. The link repository management tool may display various pieces of information related to information stored in the link repository 212, and may allow a user to display an indication of saved links.

Figure 4:
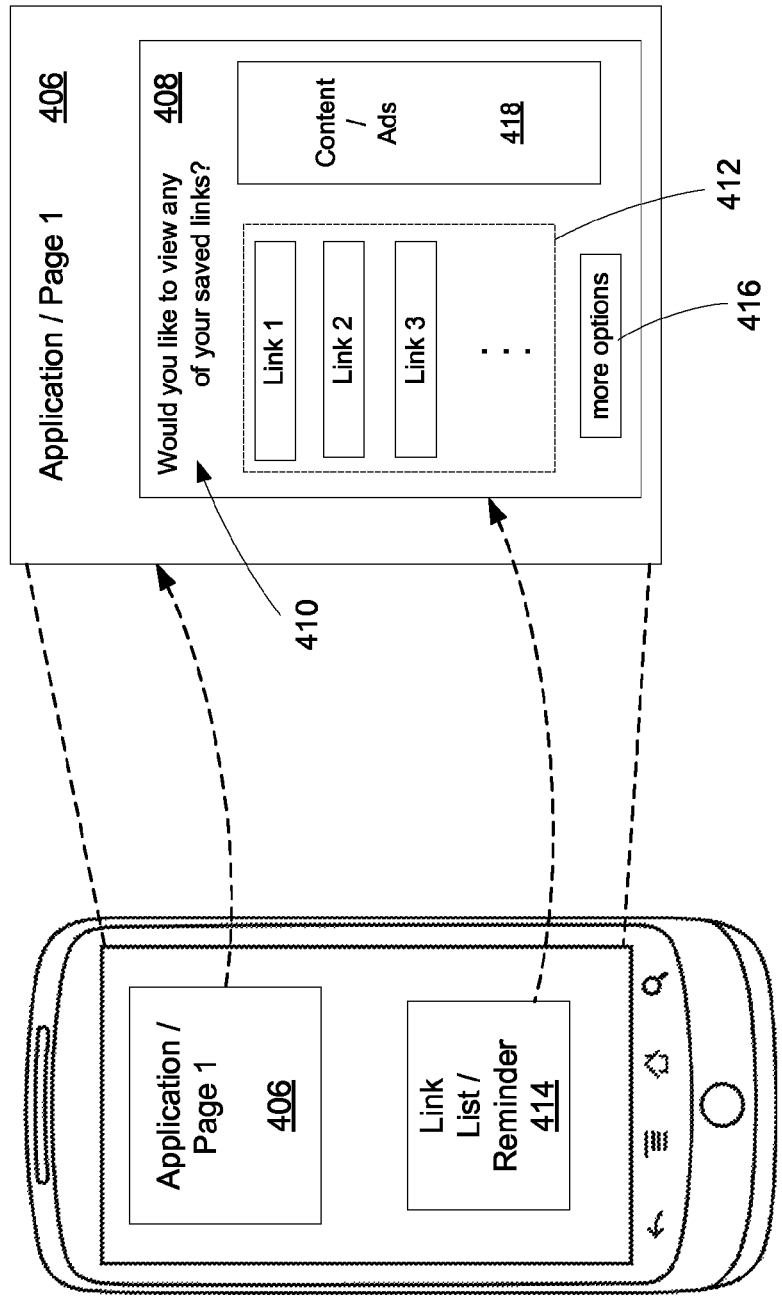
FIG. 4 depicts an illustration of an example of how various pieces of code or functions may cause various applications, pages, indications, advertisements and the like to display on the screen of a mobile device or smartphone, according to one or more embodiments of the present disclosure.

Link list/reminder 214 may display and/or remind a user of links that were stored in the link repository 212, for example, in a manner that is event-driven and/or user-query driven. Link list/reminder 214 may display an indication of links, and optionally other information, that is stored in the link repository 212. The indication of links and/or other information stored in the link repository may be displayed in various forms. FIG. 4 shows an illustration of one example of how a link list/reminder 414 may display an indication 408 of links and/or other information stored in a link repository, according to one or more embodiments of the present disclosure. As one specific example, the indication 408 of FIG. 4 may have been displayed in response to a user attempting to close or exit an application or page (e.g., part 406).

Indication 408 may include various components and/or pieces of information. Indication 408 may include one or more messages 410. The message may explain why the indication is being displayed, what content the indication includes and/or points to, what options the user may take in relation to the indication 408. The example of FIG. 4 asks the user whether the user would like to view any of the saved links. Another example message may include a query to the user regarding whether the user would like to see more information, more options and/or an expanded view or indication of information in the link repository. Indication 408 may include a preview 412 of information stored in the link repository. Preview 412 may include a sampling of links (and optionally, other information) stored in the link repository. Preview 412 may be active such that the user may be able to activate one of the links in the preview without opening an expanded view. Indication 408 may include an expansion button or option 416, which may allow a user to expand the indication 408 to display a more comprehensive view or indication of information stored in the link repository. An expanded view may display various pieces of information, for example, a portion of or all saved links that have not been revisited by the user. In some embodiments, the expanded view may be adapted to be configurable, for example, a user may be able to select how information in the expanded view is displayed. For example, a user could select to see all saved links (and optionally, contextual information) during a time period, for example, during the last day, week, month, etc. The expanded view may allow a user to sort, order and/or group the information in various ways, for example, by the time the link was saved, by the content of the contextual information associated with the link, and/or other like schemes.

Link list/reminder 214 may cause one or more applications to perform function(s) with respect to one or more links (e.g., in the indication 408 or in the expanded view). For example, if a user indicates that one of the links (e.g., in the indication 408 or in the expanded view) should be activated and/or navigated to, an application may perform one or more functions with respect to the link and/or the contextual information related to the link. For example, a new page and/or application may be launched and/or displayed on the screen of the mobile device, for example, application/page 2 (generally indicated as part 208) as shown in FIG. 2. As a specific example, a user may attempt to exit the current application/page that the user was viewing, and an indication of saved links may display. The user may then select or otherwise indicate that one of the links (e.g., a URL or URI) should be navigated to. In response, a new web browser page may be launched and/or displayed on the screen of the device, and the page may display content requested and received from the URL or URI address.

Referring again to FIG. 2, local memo 210 may include one or more content and/or ad (advertisement) targeting routines 216. Content/ad targeting routine 216 may analyze information in the link repository, for example, stored links and contextual information related to the links. Stored links and/or contextual information may provide unique information (e.g., real-time information) regarding the interests of the user that saved the links. Content/ad targeting routine 216 may communicate, for example, indirectly, with one or more content servers, for example, similar to content servers 106, 108, 110 of FIG. 1. Content/ad targeting routine 216 may include and/or communicate with content code, e.g., JavaScript code and/or code from a software development kit (SDK), that is programmed to formulate content requests and communicate the content requests to one or more content servers. Content/ad targeting routine 216 may use information about user interests, for example, received by analyzing information in the link repository, to formulate (or aid in formulating) content requests that are tailored to the specific interests of the user. For example, the content request may be formulated to request content that is related to keywords, phrases and the like that appear in the link repository. The content code and/or content/ad targeting routine 216 may then communicate, for example, via a wireless module in the mobile device, formulated content requests to the one or more content serves. The content code and/or content/ad targeting routine 216 may receive content communicated form one or more content servers, for example, in response to one or more content requests. The content may be related to information stored in the link repository, and may be uniquely tailored to the interests of the user.

In some embodiments, the content servers may be advertising servers, and may serve targeted ads that are related to specific advertising requests. In these embodiments, the content/ad targeting routine 216 may analyze the link repository to formulate (or aid in formulating) ad requests that are related to information stored in the link repository. The content code and/or content/ad targeting routine 216 may then receive one or more ads from the advertising servers, where the ads are uniquely tailored to the interests of the user.

Content/ad targeting routine 216 and/or content code may display targeted content (e.g., targeted ads) at a variety of places, for example, in a variety of applications, windows, pages, etc. FIG. 4 shows one example of how targeted content 418 may be displayed. In the example of FIG. 4, when the indication 408 of saved links (and/or an expanded view) is displayed to a user, the indication or expanded view may include an area where targeted content 418 is displayed. The content/ad targeting routine 216 may arrange and/or format the content 418 so that it associates with the links and/or additional information that is displayed in the indication 408 or expanded view. For example, referring to FIG. 4, content 418 may be arranged and/or formatted so it associates with Link 1, Link 2, Link 3, etc. In this respect, a user may choose to activate and/or navigate to targeted content 418 instead of (or in addition to) activating and/or navigating to saved links.

Figure 5:
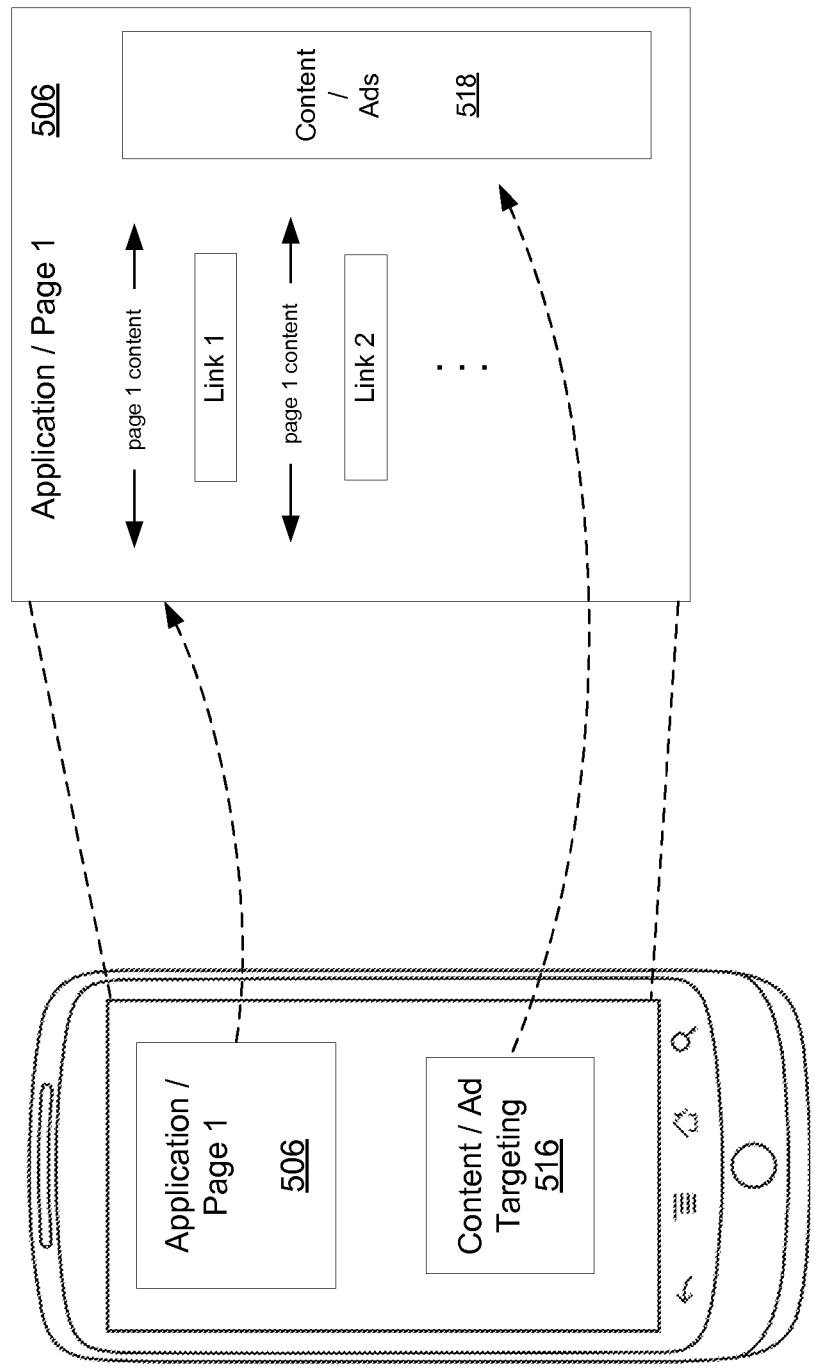
FIG. 5 depicts an illustration of an example of how various pieces of code or functions may cause various applications, pages, advertisements and the like to display on the screen of a mobile device or smartphone, according to one or more embodiments of the present disclosure.

FIG. 5 shows another example of how targeted content 518 may be displayed. In the example of FIG. 5, the application and/or page (e.g., part 506) that the user is viewing may contain an area that may display content (e.g., using content code), and a content/ad targeting routine 516 (and/or content code) may cause targeted content 518 to display on the application/page 506. For example, in operation, a user may be browsing a web page (e.g., part 506), where the webpage contains an area that is adapted to display content. At some point, the user may perform an action (according to one or more of the various techniques described herein) to indicate that one or more links (e.g., Link 1 and Link 2 as shown in FIG. 5) should be saved. The saved links may be stored in a link repository, and a content/ad targeting routine 516 may scan the link repository to aid in formulate a content request (e.g., an ad request) that is associated with information (e.g., Links 1 and 2, and related contextual information) in the link repository. The content/ad targeting routine 516 and/ or content code may then receive targeted content (e.g., targeted ads) from the content server, where the content is associated with information in the link repository (e.g., Links 1 and 2). The content/ad targeting routine 516 and/or content code may cause the targeted content 518 to display on the same application/page 506 in the appropriate area, such that the user sees uniquely relevant ads in near real-time. The content/ad targeting routine 516 and/or content code may arrange and/or format the content 518 so that it associates with nearby links and/or associated information that is displayed on the application/page 506.

Certain embodiments of the present disclosure may be found in one or more methods for a local mobile memo for non-interrupting link noting. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

FIG. 6A depicts a part 600 of a flow diagram that shows example steps in a method for a local mobile memo for non-interrupting link noting, in accordance with one or more embodiments of the present disclosure. In particular, FIG. 6A may show example steps included in saving, storing or noting links and/or additional information in a link repository. At step 602, a first application and/or page may be displaying on the screen of a mobile device. The first application and/or page may include one or more links, e.g., similar to Links 1, 2, etc. of FIG. 5. At step 604, a user may perform some action with respect to the mobile device that may indicate, among other things, that a link should be saved. At step 606, a link repository (part of a local memo) may interpret the user action. The link repository may accept and interpret various user actions, such as swipes, gestures, drags, visual motion and/or audible sounds, as explained above. At step 608, the link repository may save one or more links as indicated by the user action. The link repository may allow a user to save one or more links into the link repository without interrupting what the user is doing on a current page and/or application. The link repository may save, store or note additional information along with a link, for example, contextual information, as explained in detail above. At step 610, the link repository may cause a confirmation notice to display on the screen of the mobile device, for example, to indicate to the user that the link was saved. Several different types of confirmation notices may be displayed, as explained in detail above.

Figure 6B:
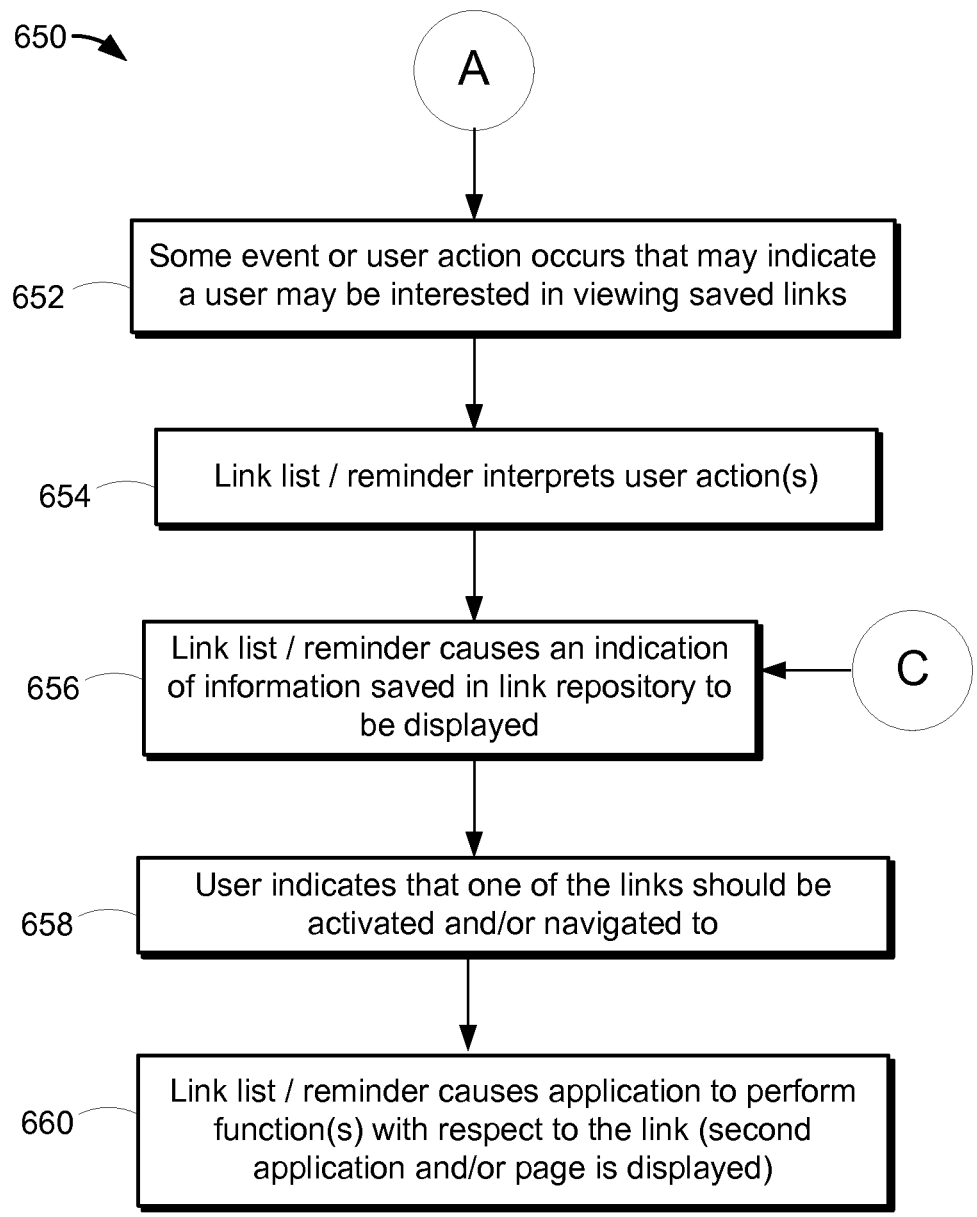

FIG. 6B depicts a part 650 a flow diagram that shows example steps in a method for a local mobile memo for non-interrupting link noting, in accordance with one or more embodiments of the present disclosure. In particular, FIG. 6B may show example steps included in displaying an indication of information stored in a link repository. At step 652, some event or user action may occur that may indicate that a user may be interested in viewing links and/or other information saved in the link repository. At step 654, a link list/reminder may detect and interpret the event or user action. As explained above, a link list/reminder may be event-driven, meaning that various events and/or routines may cause and/or trigger the link list/reminder to display an indication regarding saved links. As explained above, a link list/reminder may be user-query driven, meaning that various types of user input may cause and/or trigger the link list/reminder to display an indication regarding saved links. At step 656, the link list/reminder may cause an indication of information saved in the link repository to be displayed. The indication of links and/or other information stored in the link repository may be displayed in various forms, as explained above. Additionally, one or more expanded views may be displayed, for example, in response to user input. At step 658, the user may indicate that one of the links should be activated and/or navigated to. For example, the user may click on or touch a link that is displayed in the indication (step 656). At step 660, the link list/reminder may cause an application to perform one or more functions with respect to the link and/or the contextual information related to the link. For example, a new page and/or application may be launched and/or displayed on the screen of the mobile device, as explained above.

Figure 6C:
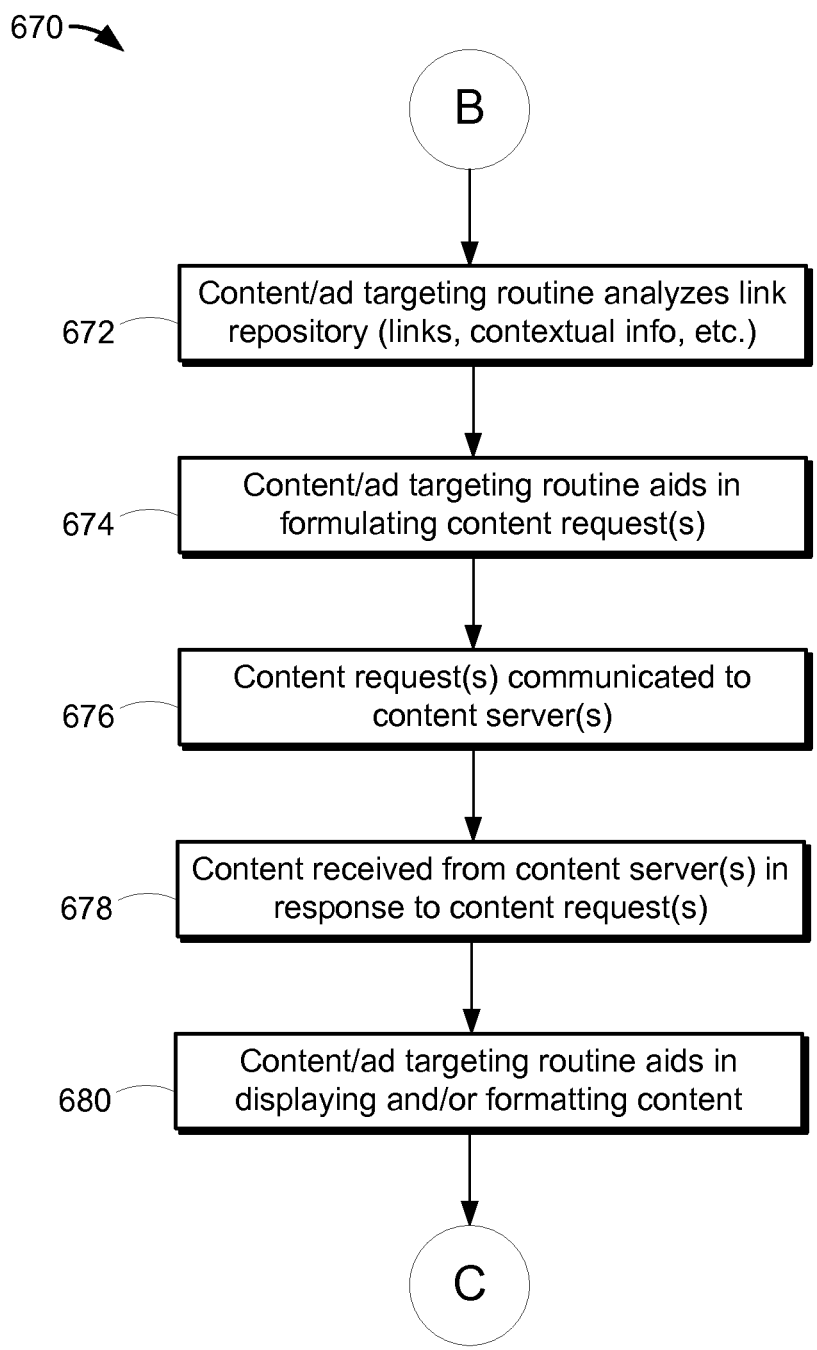

FIG. 6C depicts a part 670 of a flow diagram that shows example steps in a method for a local mobile memo for non-interrupting link noting, in accordance with one or more embodiments of the present disclosure. In particular, FIG. 6C may show how targeted ads (advertisements) may be displayed. At step 672, a content/ad targeting routine may analyze the link repository, for example, analyzing links and other information such as contextual information. As can be seen in FIGS. 6A and 6C (and circle "B"), the content/ad targeting routine may analyze links and other information saved into the link repository at step 608 of FIG. 6A. At step 674, the content/ad targeting routine may aid in formulating one or more content requests. The content/ad targeting routine may use information about user interests, for example, received by analyzing information in the link repository, to formulate content requests that are tailored to the specific interests of the user. At step 676, the content request(s) may be communicated to one or more content servers (e.g., advertising servers). At step 678, content may be received from the one or more content servers, for example, in response to the content request(s). The content request(s) may be communicated to (and content received from) the content server(s) in a variety of ways, for example, depending on where the eventual content is to be displayed. For example, if the original content is to be displayed on the application/page that a user is currently viewing, the content request may be communicated to (and content received from) the content server(s) via ad code that is included in the application/page, for example, JavaScript code and/or code from a software development kit (SDK). As another example, if the content is to be displayed when the local memo displays an indication or reminder of links in the link repository, code included in the local memo may communicate the content request and receive content. At step 680, the content/ad targeting routine may aid in displaying and/or formatting targeted content (e.g., targeted ads). As can be seen in FIGS. 6A-6C (and circle "C"), content/ads may be displayed at a variety of places. For example, an application and/or page (e.g., step 602 of FIG. 6A) that the user is viewing may contain an area that may display content, and a content/ad targeting routine may cause targeted content to display on the application/page. As another example, when an indication/reminder of saved links (and/or an expanded view) is displayed to a user (e.g., at step 656 of FIG. 6B), the indication or expanded view may include an area where targeted content is displayed. At step 680, the content/ad targeting routine may aid in arranging and/or formatting the content so that it associates with the links and/or additional information that is displayed.

Various embodiments of the present disclosure describe one or more systems, methods, routines and/or techniques for a local mobile memo for non-interrupting link noting. In one or more embodiments, a method may be executed on a data processing system, computer, mobile device, smartphone or the like. The method may include displaying to a user a page containing a link. The link may be able to be processed by a software program to perform an associated action. The method may include receiving a first user input that indicates the link should be saved for potential later processing. The method may include saving the link to a local repository so that the link can be processed later. The saving may occur while the page continues to be displayed. The saving may occur without processing the link to perform the associated action. The method may include displaying a confirmation to the user that the link has been saved to the local repository. The method may include displaying a list (e.g., including the link) of one or more links saved in the repository. The displaying of the list may occur in response to an event that indicates that the user may be interested in viewing links in the link repository. The method may include saving contextual information related to the link to the local repository. The contextual information may include information that was located near the link as it displayed on the page. The method may include displaying the contextual information when the list of one or more links is displayed. The method may include receiving a second user input that selects the link from the list of one or more links, and processing the link to perform the associated action.

The method may include retrieving content, from a remote server, that is related to one or more of the links and/or one or more of the pieces of contextual information in the link repository, and displaying the content on the first page. The method may include analyzing the link repository including the one or more links and the one or more pieces of contextual information. The method may include retrieving content, from a remote server, that is related to one or more of the links and/or one or more of the pieces of contextual information in the link repository. The method may include displaying the content near the list of one or more links saved in the repository when the list is displayed.

In some embodiments, the first user input includes swiping information generated by a touchscreen in the data processing system, where the touchscreen generates the swiping information in response to the user swiping the user's finger or a pointer across the touchscreen. In some embodiments, the link is a URL or URI and processing the link may cause a web browser to navigate to a target associated with the URL or URI. In some embodiments, the event that indicates that the user may be interested in viewing links in the link repository may include the page closing. In some embodiments, the event that indicates that the user may be interested in viewing links in the link repository may include a period of time having passed.

In one or more embodiments of the present disclosure, a method may be executed on a data processing system, computer, mobile device, smartphone or the like. The method may include displaying to a user a page containing one or more links and one or more pieces of contextual information related to the one or more links. Each of the one or more links may be able to be processed by a software program to perform an associated action. The method may include saving one or more of the links and one or more of the pieces of contextual information to a local repository. The saving may occur in response to user input, and the saving may occur while the page continues to be displayed. The saving may occur without processing the links to perform the associated actions. The method may include analyzing one or more of the links and/or one or more of the pieces of contextual information that were saved in the local repository. The method may include formulating a content request, where the content request is related to one or more of the links and/or one or more of the pieces of contextual information in the local repository. The method may include communicating the content request to a content server. The method may include receiving content from the content server, where the content was communicated by the content server in response to the content request. The method may include displaying the content on the first page. The method may include formatting the content displayed on the first page such that parts of the content are displayed respectively near relevant links and/or contextual information on the first page. In some embodiments, the content request is an advertising request and the content server is an advertising server.

One or more embodiments of the present disclosure describe a data processing system that includes one or more memory units that store computer code and one or more processor units coupled to the one or more memory units. The one or more processor units may execute the computer code stored in the one or more memory units to adapt the data processing system to display to a user a page containing a link. The link may be able to be processed by a software program to perform an associated action. The data processing system may be further adapted to receive a first user input that indicates the link should be saved for potential later processing. The data processing system may be further adapted to save the link to a local repository so that the link can be processed later. The saving may occur while the page continues to be displayed, and the saving may occur without processing the link to perform the associated action. The data processing system may be further adapted to display a confirmation to the user that the link has been saved to the local repository. The data processing system may be further adapted to display a list (e.g., including the link) of one or more links saved in the repository. The displaying may occur in response to an event that indicates that the user may be interested in viewing links in the link repository. In some embodiments, the first user input includes swiping information generated by a touchscreen in the data processing system, wherein the touchscreen generates the swiping information in response to the user swiping the user's finger or a pointer across the touchscreen. In some embodiments, the event that indicates that the user may be interested in viewing links in the link repository may include the page closing.

In some embodiments, the data processing system may be further adapted to save contextual information related to the link to the local repository. The contextual information may include information that was located near the link as it displayed on the page. The data processing system may be further adapted to display the contextual information when the list of one or more links is displayed. The data processing system may be further adapted to receive a second user input that selects the link from the list of one or more links, and process the link to perform the associated action. The data processing system may be further adapted to analyze the link repository including the one or more links and the one or more pieces of contextual information. The data processing system may be further adapted to retrieve content, from a remote server, that is related to one or more of the links and/or one or more of the pieces of contextual information in the link repository. The data processing system may be further adapted to display the content on the first page. The data processing system may be further adapted to analyze the link repository including the one or more links and the one or more pieces of contextual information. The data processing system may be further adapted to retrieve content, from a remote server, that is related to one or more of the links and/or one or more of the pieces of contextual information in the link repository. The data processing system may be further adapted to display the content near the list of one or more links saved in the repository when the list is displayed.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alterative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in a different order depending upon the functionality involved. Part or all of the computer code may be loaded into the memory of a data processing system before the data processing system executes the code.

Figure 7:
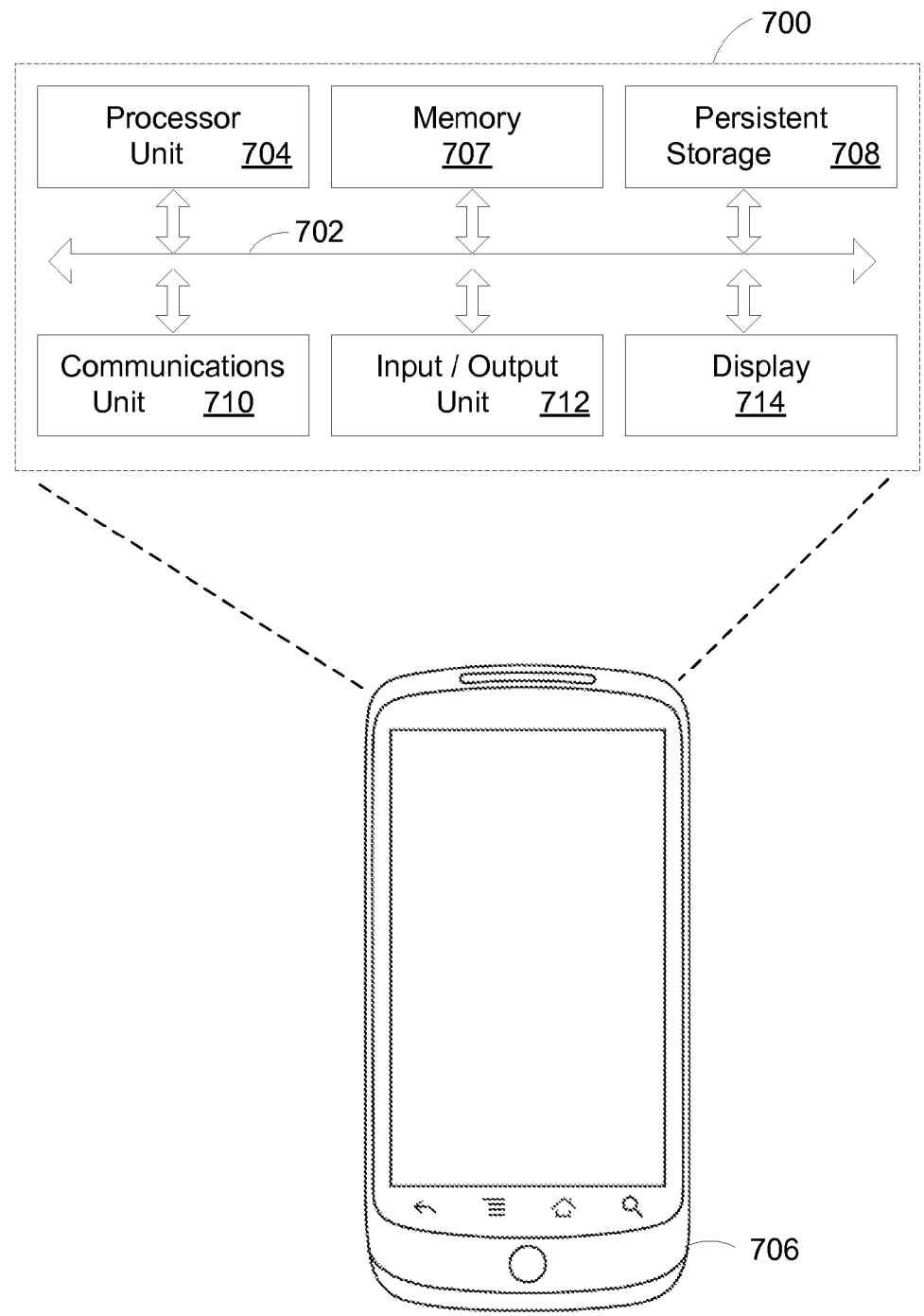
FIG. 7 depicts a block diagram of an example data processing system 700 that may be included within a mobile device 706 or smartphone, according to one or more embodiments of the present disclosure.

FIG. 7 depicts a block diagram of an example data processing system 700 that may be included within a mobile device 706 or smartphone, according to one or more embodiments of the present disclosure. The data processing system 700 may be used to execute, either partially or wholly, one or more of the methods, routines and/or solutions of the present disclosure. In some embodiments of the present disclosure, more than one data processing system, for example data processing systems 700, may be used to implement the methods, routines, techniques and/or solutions described herein. In the example of FIG. 7, data processing system 700 may include a communications fabric 702 which provides communications between components, for example a processor unit 704, a memory 707, a persistent storage 708, a communications unit 710, an input/output (I/O) unit 712 and a display 714. A bus system may be used to implement communications fabric 702 and may be comprised of one or more buses such as a system bus or an input/output bus. The bus system may be implemented using any suitable type of architecture that provides for a transfer of data between different components or devices attached to the bus system.

Processor unit 704 may serve to execute instructions (for example, a software program, an application, SDK code, native OS code and the like) that may be loaded into the data processing system 700, for example, into memory 707. Processor unit 704 may be a set of one or more processors or may be a multiprocessor core depending on the particular implementation. Processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 707 may be, for example, a random access memory or any other suitable volatile or nonvolatile storage device. Memory 707 may include one or more layers of cache memory. Persistent storage 708 may take various forms depending on the particular implementation. For example, persistent storage 708 may contain one or more components or devices. For example, persistent storage 708 may be a hard drive, a solid-state drive, a flash memory or some combination of the above.

Instructions for an operating system may be located on persistent storage 708. In one specific embodiment, the operating system may be some version of a number of known operating systems for mobile devices or smartphones (e.g, Android, iOS, etc.). Instructions for applications and/or programs may also be located on persistent storage 708. These instructions may be loaded into memory 707 for execution by processor unit 704. For example, the methods and/or processes of the different embodiments described in this disclosure may be performed by processor unit 704 using computer implemented instructions which may be loaded into a memory such as memory 707. These instructions are referred to as program code, computer usable program code or computer readable program code that may be read and executed by a processor in processor unit 704.

Display 714 may comprise a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 712 allows for input and output of data with other devices that may be connected to data processing system 700. Input/output devices can be coupled to the system either directly or through intervening I/O controllers.

Communications unit 710 may provide for communications with other data processing systems or devices, for example, via one or more networks. Communications unit 710 may be a network interface card. Communications unit 710 may provide communications through the use of wired and/or wireless communications links. In some embodiments, the communications unit may include circuitry that communicates according to various wireless communication standards, for example, cellular standards, WIFI standards, Bluetooth standards and the like.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method executed by a data processing system having at least one processor, the method comprising:
providing for display a page containing at least one link, wherein the at least one link is configured to be processed by a software program to perform an associated action;
receiving a first input that identifies a first link of the at least one link;
saving the first link to a local repository in response to the first input, so that the first link can be processed later, wherein the saving occurs while the page continues to be provided, and wherein the saving occurs without processing the first link to perform the associated action;
saving, with the first link, in response to the first input, contextual information related to the first link to the local repository, wherein the contextual information includes information that was located on the page, and wherein the contextual information comprises up to two sentences of text that indicate content that the first link is associated with;
saving, with the first link, in response to the first input, a reverse link to the local repository so that the reverse link can be processed later, wherein the reverse link comprises a Uniform Resource Locator (URL) or Uniform Resource Identifier (URI) of the page and processing the reverse link causes a web browser to navigate to the page;
providing for display a confirmation that the first link has been saved to the local repository;
providing for display a list of one or more links saved in the repository, wherein the list includes the first link and the reverse link, and wherein the providing of the list occurs in response to receipt of a request to close or exit the page;
providing for display a second page containing second content;
making a determination that the second content of the second page is similar to the contextual information related to the first link; and
providing for display the list of one or more links saved in the repository, wherein the providing occurs in response to the determination that the second content of the second page is similar to the contextual information related to the first link.

2. The method of claim 1, further comprising:
providing for display the contextual information with the first link when the list of one or more links is provided in response to receipt of the request to close or exit the page; and
providing for display the contextual information with the first link in response to the determination that the second content of the second page is similar to the contextual information related to the first link.

3. The method of claim 2, further comprising:
analyzing the link repository including the one or more links and the contextual information;
retrieving third content, from a remote server, that is related to one or more of the links and the contextual information in the link repository; and
providing for display the third content on the page.

4. The method of claim 2, further comprising:
analyzing the link repository including the one or more links and the contextual information;
retrieving third content, from a remote server, that is related to one or more of the links and the contextual information in the link repository; and
providing for display the third content with the list of one or more links saved in the repository when the list is provided in response to receipt of the request to close or exit the page.

5. The method of claim 1, wherein the first input includes swiping information generated by a touchscreen in the data processing system.

6. The method of claim 1, further comprising:
receiving a second input that selects the first link from the list of one or more links; and
processing the first link to perform the associated action.

7. The method of claim 6, wherein the first link is a second Uniform Resource Locator (URL) or Uniform Resource Identifier (URI) and processing the first link causes the web browser to navigate to a target associated with the second URL or URI.

8. The method of claim 1, further comprising:
receiving a second input that selects the reverse link from the list of one or more links; and
processing the reverse link to cause the web browser to navigate to the page.

9. A data processing system, comprising:
one or more memory units that store computer code; and
one or more processor units coupled to the one or more memory units, wherein the one or more processor units execute the computer code stored in the one or more memory units to adapt the data processing system to:
provide for display a page containing at least one link, wherein the at least one link is configured to be processed by a software program to perform an associated action;
receive a first input that identifies a first link of the at least one link;
save the first link to a local repository, in response to the first input, so that the first link can be processed later, wherein the saving occurs while the page continues to be provided, and wherein the saving occurs without processing the first link to perform the associated action;
save, with the first link, in response to the first input, contextual information related to the first link to the local repository, wherein the contextual information includes information that was located on the page, and wherein the contextual information comprises up to two sentences of text that indicate content that the first link is associated with;
save, with the first link, in response to the first input, a reverse link to the local repository so that the reverse link can be processed later, wherein the reverse link comprises a Uniform Resource Locator (URL) or Uniform Resource Identifier (URI) of the page and processing the reverse link causes a web browser to navigate to the page;
provide for display a confirmation that the first link has been saved to the local repository;
provide for display a list of one or more links saved in the repository, wherein the list includes the first link and the reverse link, and wherein the providing occurs in response to receipt of a request to close or exit the page;
provide for display a second page containing second content;
make a determination that the second content of the second page is similar to the contextual information related to the first link; and
provide for display the list of one or more links saved in the repository, wherein the providing occurs in response to the determination that the second content of the second page is similar to the contextual information related to the first link.

10. The data processing system of claim 9, wherein the data processing system is further adapted to:
provide for display the contextual information with the first link when the list of one or more links is provided in response to receipt of the request to close or exit the page; and
provide for display the contextual information with the first link in response to the determination that the second content of the second page is similar to the contextual information related to the first link.

11. The data processing system of claim 10, wherein the data processing system is further adapted to:
analyze the link repository including the one or more links and the contextual information;
retrieve third content, from a remote server, that is related to one or more of the links and the contextual information in the link repository; and
provide for display the third content on the page.

12. The data processing system of claim 10, wherein the data processing system is further adapted to:
analyze the link repository including the one or more links and the contextual information;
retrieve third content, from a remote server, that is related to one or more of the links and the contextual information in the link repository; and
provide for display the third content with the list of one or more links saved in the repository when the list is provided in response to receipt of the request to close or exit the page.

13. The data processing system of claim 9, wherein the first input includes swiping information generated by a touchscreen in the data processing system.

14. The data processing system of claim 9, wherein the data processing system is further adapted to:
receive a second input that selects the first link from the list of one or more links; and process the first link to perform the associated action.

15. The data processing system of claim 9, wherein the data processing system is further adapted to:

receive a second input that selects the reverse link from the list of one or more links; and process the reverse link to cause the web browser to navigate to the page.

* * * * *